United States Patent [19]

Hirose et al.

[11] Patent Number: 5,674,398
[45] Date of Patent: Oct. 7, 1997

[54] COMPOSITE REVERSE OSMOSIS MEMBRANE

[75] Inventors: Masahiko Hirose; Kenichi Ikeda; Masatoshi Maeda, all of Osaka, Japan

[73] Assignee: Nitto Denko Corporation, Osaka, Japan

[21] Appl. No.: 496,288

[22] Filed: Jun. 29, 1995

[30] Foreign Application Priority Data

Jun. 29, 1994 [JP] Japan .................................. 6-147711

[51] Int. Cl.$^6$ ............................................. B01D 39/00
[52] U.S. Cl. ........................ 210/500.38; 210/500.37; 210/490
[58] Field of Search ............................ 210/490, 500.37, 210/500.38; 427/245

[56] References Cited

U.S. PATENT DOCUMENTS

| | | | |
|---|---|---|---|
| 3,744,642 | 7/1973 | Scala et al. | 210/490 |
| 4,020,142 | 4/1977 | Davis et al. | 210/500.23 |
| 5,051,178 | 9/1991 | Uremura et al. | 210/500.38 |
| 5,152,901 | 10/1992 | Hodgdon | 210/500.38 |
| 5,336,404 | 8/1994 | Hachisaka et al. | 210/500.37 X |

*Primary Examiner*—Ana Fortuna
*Attorney, Agent, or Firm*—Sughrue, Mion, Zinn, Macpeak and Seas

[57] ABSTRACT

A composite reverse osmosis membrane comprising a thin film and a microporous substrate as a support therefor, said thin film mainly comprising a crosslinked polyamide obtained by the interfacial polymerization of (a) an amine component comprising at least one monomeric amine compound having at least two primary or/and secondary amino groups and (b) an acid halide component which is either a benzenehexacarbonyl halide or a mixture of a benzenehexacarbonyl halide with a monomeric acid halide compound having at least two acid halide groups. The composite reverse osmosis membrane exhibits high water permeability and high desalting performance even when used at a low operation pressure of, e.g., 5 kgf/cm$^2$.

4 Claims, No Drawings

COMPOSITE REVERSE OSMOSIS MEMBRANE

1. Field of the Invention

The present invention relates to a composite reverse osmosis membrane for the selective permeation and separation of components in a liquid mixture. This membrane is especially suitable for the production of ultra-pure water, desalting of brackish water, and the like. It is also effective in removing or recovering pollutants or effective substances from contaminated wastewaters and the like which cause environmental pollution, such as wastewaters resulting from dyeing, electrodeposition coating, etc., to thereby contribute to wastewater closing.

2. Background of the Invention

Conventionally known as a reverse osmosis membrane different in structure from asymmetric reverse osmosis membranes is a composite reverse osmosis membrane obtained by forming on a microporous substrate an active thin film capable of substantially selective separation.

A larger number of composite reverse osmosis membranes of the above kind are presently known which comprise a substrate and formed thereon a thin film of a polyamide obtained by the interfacial polymerization of a polyfunctional aromatic amine and a polyfunctional aromatic acid halide (e.g., U.S. Pat. Nos. 4,277,344, 4,761,234, and 4,872,984 and JP-A-63-218208). (The term "JP-A" as used herein means an "unexamined published Japanese patent application.")

Incorporation of hydrophilic groups into the film for increasing water permeability is also known (e.g., JP-A-57-119928, JP-A-59-179103, and JP-A-62-53703). Further, it has been proposed to perform treatment with an aqueous alkali solution after the incorporation of hydrophilic groups into the film to thereby enhance water permeability (e.g., JP-A-63-7807).

All the conventional composite reverse osmosis membranes described above have a problem of high equipment and running costs, since the film performance thereof is generally exhibited only when the reverse osmosis membranes are used at a medium to high operation pressure of 15 kgf/cm² or higher. Because of this, there recently is a desire for an economical composite reverse osmosis membrane which has high desalting performance and high water permeability even when used at a lower operation pressure of, e.g., 5 kgf/cm².

SUMMARY OF THE INVENTION

An object of the present invention is to provide a composite reverse osmosis membrane which eliminates the problem described above and combines high desalting performance and high water permeability even when used at a low operation pressure of, e.g., 5 kgf/cm².

In order to accomplish the above object, the composite reverse osmosis membrane of the present invention comprises a thin film and a microporous substrate as a support therefor, said thin film mainly comprising a crosslinked polyamide obtained by the interfacial polymerization of (a) an amine component comprising at least one monomeric amine compound having at least two primary or/and secondary amino groups and (b) an acid halide component which is either a benzenehexacarbonyl halide or a mixture of a benzenehexacarbonyl halide with a monomeric acid halide compound having at least two acid halide groups.

DETAILED DESCRIPTION OF THE INVENTION

The amine component (a) used with the acid halide component (b) to form the polymer for use in this invention is not particularly limited, as long as it is a polyfunctional amine comprising at least one amine compound selected from monomeric amine compounds each having at least two primary or/and secondary amino groups. The polyfunctional amine may be aromatic, aliphatic, or alicyclic.

Examples of the aromatic polyfunctional amine compound include m-phenylenediamine, p-phenylenediamine, 1,3,5-triaminobenzene, 1,2,4-triaminobenzene, 3,5-diaminobenzoic acid, 2,6-diaminotoluene, 2,4-diaminoanisole, and xylylenediamine.

Examples of the aliphatic polyfunctional amine compound include ethylenediamine, propylenediamine, and tris(2-aminoethyl)amine.

Examples of the alicyclic polyfunctional amine compound include 1,3-diaminocyclohexane, 1,2-diaminocyclohexane, 1,4-diaminocyclohexane, piperazine, 2,5-dimethylpiperazine, and 4-aminomethylpiperazine.

These amines may be used alone or in admixture.

The acid halide component (b) for use in this invention is characterized in that it comprises at least a benzenehexacarbonyl halide (a benzene ring having six —COX groups where X each independently represents a halogen atom). If component (b) does not contain a benzenehexacarbonyl halide, sufficient water permeability cannot be obtained at low operation pressures. The acid halide component (b) for use in this invention is either a benzenehexacarbonyl halide alone or a mixture thereof with a monomeric acid halide compound having at least two acid halide groups. The kind of the halogen atoms contained in the benzenehexacarbonyl halide is not limited, and examples thereof include chlorine and bromine, with chlorine being preferred. The halogen atoms contained in the benzenehexacarbonyl halide may be the same or different.

The monomeric acid halide compound having at least two acid halide groups is not particularly limited. Examples of the monomeric acid halide compound include aromatic, aliphatic, and alicyclic polyfunctional acid halides. Examples of the acid halide group include a group represented by —COY or —SO$_2$Y where Y is a halogen atom.

The content of the benzenehexacarbonyl halide in the acid halide component (b) is preferably from 10 to 100% by weight. In the case where component (b) is a mixture, the monomeric acid halide compound may consist of a single compound or a mixture of two or more compounds. However, benzenehexacarbonyl halide contents lower than 10% may pose a problem that improvement in water permeability at a low operation pressure, e.g., 5 kgf/cm², is insufficient, depending on the combination of ingredients constituting the acid halide component, although the water permeability attainable in this case is higher than those of conventional composite reverse osmosis membranes. The range of benzenehexacarbonyl halide contents most effective in improving desalting performance and water permeability at such a low operation pressure as 5 kgf/cm² is from 20 to 100%.

Examples of the aromatic polyfunctional acid halide compound include trimesic acid halides, trimellitic acid halides, halides of trimellitic anhydride, terephthalic acid halides, isophthalic acid halides, biphenyldicarboxylic acid halides, naphthalenedicarboxlic acid halides, benzenedisulfonyl halides, benzenetrisulfonyl halides, 5-sulfonylchloride isophthalic acid halide(s), and pyridinedicarbonyl halides.

Examples of the aliphatic polyfunctional acid halide compound include propanetricarboxylic acid halides, butanetricarboxyic acid halides, pentanetricarboxylic acid halides, glutaryl halides, and adipoyl halides.

Examples of the alicyclic polyfunctional acid halide compound include cyclopropanetricarboxylic acid halides, cyclobutanetetracarboxylic acid halides, cyclopentanetricarboxylic acid halides, cyclopentanetetracarboxylic acid halides, cyclohexanetricarboxylic acid halides, tetrahydrofurantetracarbonyl halides, cyclobutanedicarboxylic acid halides, cyclopentanedicarboxylic acid halides, cyclohexanedicarboxylic acid halides, and tetrahydrofurandicarboxylic acid halides.

In the present invention, a polar-solvent solution containing the amine component described above is subjected to interfacial polymerization with an organic-solvent solution containing the acid halide component described above to form on a microporous substrate a thin film consisting mainly of a crosslinked polyamide. Thus, a composite reverse osmosis membrane is obtained.

The microporous substrate for use in this invention is not particularly limited as long as it is capable of supporting the thin film thereon. The thickness of the microporous substrate is not limited, but it is generally about from 25 to 125 μm, preferably about from 40 to 75 μm. An ultrafiltration membrane having surface pores with a diameter of from 10 to 500Å is usually employed. Examples of the material of the substrate include various substances such as polysulfones, polyethersulfones, polyimides, polyamides, poly(vinylidene fluoride), ethylene-vinyl alcohol copolymers, and cellulose acetate. From the standpoint of chemical, mechanical, and thermal stability, ultrafiltration membranes made of a polysulfone, a polyethersulfone, or the like are especially preferably used. Such ultrafiltration membranes may be reinforced with a woven fabric, a nonwoven fabric, etc.

The amine salts described in JP-A-2-187135, e.g., a tetraalkylammonium halide and a salt of a trialkylamine with an organic acid, are advantageously used for, e.g., facilitating film formation, improving the absorption of the amine solution into the substrate membrane, and accelerating the condensation reaction.

A surfactant such as, for example, sodium dodecylbenzenesulfonate, sodium dodecylsulfate, or sodium laurylsulfate may be further incorporated. These surfactants are effective in improving the wettability of the microporous substrate by the polar-solvent solution containing the amine component. For accelerating the interfacial polycondensation reaction, it is desirable to use sodium hydroxide or trisodium phosphate, which each is capable of removing the hydrogen halide resulting from the interfacial reaction, or to use an acylation catalyst or the like as a catalyst.

The amine compound concentration in the polar-solvent solution containing the amine component described above is not particularly limited, but it is usually from 0.1 to 10% by weight, preferably from 0.3 to 5% by weight.

The polar-solvent solution containing the amine component is not particularly limited in the kind of the polar solvent, as long as the polar solvent is one in which the amine component used well dissolves and the microporous substrate used is insoluble. Examples of the polar solvent include water.

In the organic-solvent solution containing the acid halide component (b), the concentration of the benzenehexacarbonyl halide alone or of the mixture thereof with a monomeric acid halide compound having at least two acid halide groups is not particularly limited, but it is usually from 0.01 to 5% by weight, preferably from 0.05 to 1% by weight.

The organic-solvent solution containing the acid halide component is not particularly limited in the kind of the organic solvent, as long as the organic solvent is one in which the acid halide component used well dissolves and which is immiscible with the polar solvent used. For example, aliphatic and alicyclic hydrocarbons having 5 to 10 carbon atoms may be used. Examples of such hydrocarbons include pentane, hexane, heptane, octane, and cyclopentane.

The thin film can be provided on the microporous substrate as follows. The microporous substrate is coated with a polar-solvent solution containing the amine component. Subsequently, an organic-solvent solution containing the acid halide component is coated thereon, whereby interfacial polymerization is conducted to form a thin film. The polymerization temperature is preferably from 5° to 50° C. The thickness of the thin film is preferably from 0.001 to 1 μm.

If desired and necessary, heat treatment is performed. This heating may be conducted at 40° to 180° C., preferably 70° to 150° C., for 1 to 60 minutes, preferably 2 to 30 minutes.

The present invention will be explained below by reference to Examples, but the invention should not be construed as being limited thereto.

As a microporous substrate was used a polysulfone ultrafiltration membrane. Performances of each composite reverse osmosis membrane obtained were examined by passing an aqueous solution containing 1,500 ppm of sodium chloride and having a pH of 6.5 through the membrane at 25° C. for 1 hour at an operation pressure of 5 kgf/cm$^2$ and then measuring rejection for sodium chloride and permeation flux. The sodium chloride rejection was determined by measuring electrical conductance in an ordinary way.

EXAMPLE 1

Production of Composite Reverse Osmosis Membrane

An aqueous solution containing 2.0 wt % m-phenylenediamine, 0.15 wt % sodium laurylsulfate, 2.0 wt % triethylamine, and 4.0 wt % camphorsulfonic acid was brought into contact with a polysulfone ultrafiltration membrane as a microporous substrate. The excess aqueous solution was then removed to form a layer of the aqueous solution on the substrate.

Subsequently, the surface of this substrate was brought into contact with an isooctane solution containing 0.15 wt % benzenehexacarbonyl chloride synthesized from benzenehexacarboxylic acid using phosphorus pentoxide. The resulting substrate was placed in a 120° C. hot-air drying oven for 3 minutes to form a thin polymer film on the microporous substrate. Thus, a composite reverse osmosis membrane was obtained.

Performances of the composite reverse osmosis membrane obtained were evaluated. As a result, the salt rejection was 91% and the permeation flux was 0.8 m$^3$/m$^2$·day.

EXAMPLES 2 TO 4

Composite reverse osmosis membranes were produced in the same manner as in Example 1, except that in place of benzenehexacarbonyl chloride as the acid halide component, a mixture of benzenehexacarbonyl chloride with trimesic acid chloride was used in the respective concentrations by weight shown in Table. Performances of each composite reverse osmosis membrane obtained are shown in Table.

COMPARATIVE EXAMPLE 1

A composite reverse osmosis membrane was produced in the same manner as in Example 1, except that benzenetetracarbonyl chloride was used in place of benzenehexacarbonyl chloride used as the acid halide component. Performances of the composite reverse osmosis membrane obtained are shown in Table.

COMPARATIVE EXAMPLE 2

A composite reverse osmosis membrane was produced in the same manner as in Example 1, except that trimesic acid chloride was used in place of benzenehexacarbonyl chloride used as the acid halide component. Performances of the composite reverse osmosis membrane obtained are shown in Table.

TABLE

| Sample No. | Acid Halide Compound | Concentration (wt %) | Rejection (%) | Permeation Flux ($m^3/m^2 \cdot day$) |
|---|---|---|---|---|
| Example 1 | BHCC | 0.15 | 91 | 0.8 |
| Example 2 | BHCC | 0.15 | 98 | 0.7 |
| | TMC | 0.05 | | |
| Example 3 | BHCC | 0.1 | 99 | 0.6 |
| | TMC | 0.1 | | |
| Example 4 | BHCC | 0.05 | 99 | 0.5 |
| | TMC | 0.15 | | |
| Comparative Example 1 | BTCC | 0.15 | 91 | 0.3 |
| Comparative Example 2 | TMC | 0.15 | 99 | 0.2 |

BHCC: Benzenehexacarbonyl chloride
TMC: Trimesic acid chloride

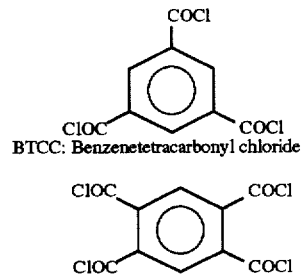

BTCC: Benzenetetracarbonyl chloride

As apparent from the performances shown in Table, the composite reverse osmosis membrane of the present invention combines high water permeability and high desalting performance as compared with conventional composite reverse osmosis membranes even when used at a low operation pressure of, e.g., 5 kgf/cm$^2$. Hence, the composite reverse osmosis membrane of this invention can be advantageously used in various fields where especially clean water is required, for example, for turning brackish water, seawater, etc. into fresh water by desalting and for producing ultra-pure water necessary for semiconductor production. The composite reverse osmosis membrane of this invention also has a great economic merit because of its low equipment and running costs.

In the case where the acid halide component is a mixture of a benzenehexacarbonyl halide with a monomeric acid halide compound having at least two acid halide groups, the water permeability and the desalting performance of the composite reverse osmosis membrane of this invention can be controlled by suitably selecting the mixing ratio.

When the composite reverse osmosis membrane of the present invention is used at a medium operation pressure of, e.g., 15 kgf/cm$^2$, it has improved water permeability higher than its water permeability in low-pressure operation while maintaining the desalting performance exhibited in low-pressure operation. Consequently, the composite reverse osmosis membrane of this invention shows significantly improved water permeability when evaluated in a medium-to high-pressure operation as in the case of using conventional composite reverse osmosis membranes.

While the invention has been described in detail and with reference to specific embodiments thereof, it will be apparent to one skilled in the art that various changes and modifications can be made therein without departing from the spirit and scope thereof.

What is claimed is:

1. A composite reverse osmosis membrane comprising a thin film and a microporous substrate as a support therefor, said thin film mainly comprising a crosslinked polyamide obtained by the interfacial polymerization of (a) an amine component comprising at least one monomeric amine compound having at least two primary or/and secondary amino groups and (b) an acid halide component which is either a benzenehexacarbonyl halide or a mixture of a benzenehexacarbonyl halide with a monomeric acid halide compound having at least two acid halide groups.

2. The composite reverse osmosis membrane of claim 1, wherein the concentration of the benzenehexacarbonyl halide in the acid halide component (b) is from 10 to 100% by weight.

3. The composite reverse osmosis membrane of claim 1, wherein the concentration of the benzenehexacarbonyl halide in the acid halide component (b) is from 20 to 100% by weight.

4. The composite reverse osmosis membrane of claim 1, wherein the amine component is at least one selected from the group consisting of m-phenylenediamine, p-phenylenediamine, 1,3,5-triaminobenzene, 1,2,4-triaminobenzene, 3,5-diaminobenzoic acid, 2,6-diaminotoluene, 2,4-diaminoanisole, xylylenediamine, ethylenediamine, propylenediamine, tris(2-aminoethyl)amine, 1,3-diaminocyclohexane, 1,2-diaminocyclohexane, 1,4-diaminocyclohexane, piperazine, 2,5-dimethylpiperazine, and 4-aminomethylpiperazine.

* * * * *